United States Patent [19]
Kawaguchi

[11] Patent Number: 6,031,351
[45] Date of Patent: Feb. 29, 2000

[54] DRIVING CONTROL CIRCUIT, DRIVING CONTROL METHOD AND ELECTRONIC EQUIPMENT

[75] Inventor: Naoki Kawaguchi, Kanagawa, Japan

[73] Assignee: Sony Corporation, Tokyo, Japan

[21] Appl. No.: 08/980,415

[22] Filed: Nov. 28, 1997

[30] Foreign Application Priority Data

Nov. 29, 1996 [JP] Japan ................................. 8-333100

[51] Int. Cl.[7] ............................... G05B 1/06; G05B 5/00
[52] U.S. Cl. ........................ 318/630; 318/640; 318/467; 396/52; 396/55
[58] Field of Search .................................. 318/138, 139, 318/640, 630, 245, 254, 471, 467; 388/811, 934; 396/55, 238, 52; 354/430, 410, 400; 363/21, 95, 97; 258/213.19, 213.13, 906, 909; 250/201.6

[56] References Cited

U.S. PATENT DOCUMENTS

| | | | |
|---|---|---|---|
| 3,705,328 | 12/1972 | Torok | 315/26 |
| 3,872,499 | 3/1975 | McConnell et al. | 358/51 |
| 4,085,320 | 4/1978 | Wilwerding | 250/201 |
| 4,263,565 | 4/1981 | Astle | 331/15 |
| 4,862,046 | 8/1989 | Preston | 318/467 |
| 5,148,011 | 9/1992 | Taka | 250/201.6 |
| 5,168,364 | 12/1992 | Kondo et al. | 258/213.19 |
| 5,408,401 | 4/1995 | Miyazaki | 363/21 |
| 5,576,787 | 11/1996 | Kai et al. | 396/55 |
| 5,640,611 | 6/1997 | Kai et al. | 396/55 |

*Primary Examiner*—Paul Ip
*Attorney, Agent, or Firm*—Frommer Lawrence & Haug, LLP.; William S. Frommer

[57] ABSTRACT

An electrical power efficiency of the driving circuit is improved. The OP amplifier in the control arithmetic circuit compares a controlling amount with an added value of a target value and an AC signal and then outputs the comparing signal to the driving circuit. Since the transistor in the driving circuit is controlled in switching by the comparing signal, its loss of electrical power is reduced. Accordingly, an electrical power efficiency of the driving circuit is improved. In addition, the driving circuit drives the actuator section, a controlling amount of the actuator is detected by the position sensing unit and it is fed back as the controlling amount to the controlling arithmetic circuit.

12 Claims, 5 Drawing Sheets

NON-SENSITIVE
BAND

FIG. 7

DRIVING CONTROL CIRCUIT, DRIVING CONTROL METHOD AND ELECTRONIC EQUIPMENT

BACKGROUND OF THE INVENTION

1. Field of the Invention

This invention relates a driving control circuit, a driving control method and an electronic equipment provided with the driving control circuit which are preferable for driving an electromagnetic motor or the like.

2. Description of the Prior Art

As a driving control circuit for driving an actuator such as an electromagnetic motor or the like, it is well known that there is provided a circuit to cause the actuator to be connected to the collector terminal of a transistor so as to apply a control voltage to the base terminal of the transistor.

Figure 7:
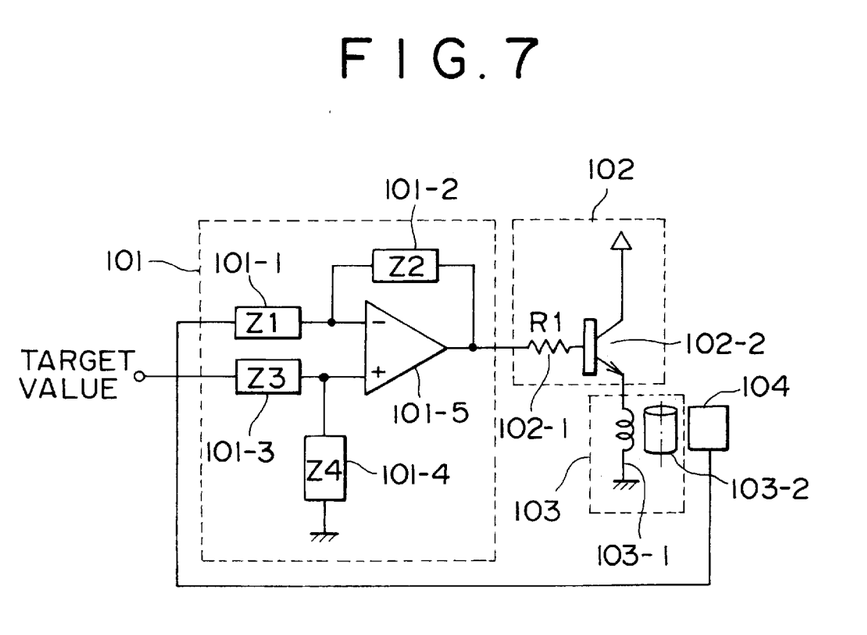
FIG. 7 is a view for showing the prior art driving control circuit.

In FIG. 7 is shown one example of a circuit diagram of this type of prior art driving control circuit. In FIG. 7, reference numeral 101 denotes a control arithmetic section, 102 a driving circuit, 103 an actuator section, and 104 a position sensing unit for use in sensing a driven position of a rotor magnet 103-2 of the actuator section 103.

In addition, to the control arithmetic section 101 are inputted a certain target value to cause the actuator section 103 to be rotationally controlled up to a desired position and a controlling amount signal outputted from a position sensing unit 104. Within the control arithmetic section 101, the target value is inputted to a non-inverting input terminal of an OP amplifier 101-5 through an impedance element (Z3) 101-3, and the controlling amount signal is inputted to an inverting input terminal of the OP amplifier 101-5 through an impedance element (Z1)101-1. An impedance element (Z4)101-4 is connected between a non-inverting input terminal of the OP amplifier 101-5 and the ground and further a negative feed-back impedance element (Z2)101-2 is connected between the non-inverting input terminal and an output terminal of the OP amplifier 101-5. These impedance elements are comprised of either a single resistor or a combination of a resistor and a capacitor.

Operation of the driving control circuit constructed as described above will be described as follows, wherein a negative feed-back impedance element 101-2 is connected to the OP amplifier 101-5, resulting in that such an output signal as one in which a signal inputted to a non-inverting input terminal and a signal inputted to a non-inverting input terminal may become the same value is outputted. In this case, a target value is applied to a non-inverting input terminal of the OP amplifier 101-5, a voltage is divided by the impedance element 101-3 and the impedance element 101-4 and applied and a control amount signal obtained from the position sensing unit 104 is inputted to the inverting input terminal through the impedance element 101-1, so that an error signal in which a controlling amount signal is coincided with a target value is outputted from the OP amplifier 101-5.

The driving circuit 102 is driven after this error signal is supplied and an error signal is applied to the base terminal of the transistor 102-2 in the driving circuit 102 and then an emitter current corresponding to that level starts to flow.

As a result, the emitter current at the transistor 102-2 is applied as a current amount corresponding to a difference between the target value signal and a controlling amount, and then the rotor magnet 103-2 is rotationally driven in response to this emitter current amount.

Accordingly, the rotor magnet 103-2 of the actuator section 103 is rotated up to a predetermined rotational angle corresponding to the target value. In addition, a rotating amount of this rotor magnet 103-2 is detected by the position sensing unit 104, fed back to the control arithmetic circuit 101 and the driving circuit 102 becomes to be driven by the error signal until the rotor magnet 103-2 reaches up to the position of the target value.

In the aforesaid prior art driving control circuit, a base-biasing voltage of the transistor 102-2 in the driving circuit 102 is applied as an error voltage and the emitter current is controlled in an analogous manner, resulting in that the transistor 102-2 is operated in a non-saturated region. Accordingly, at the transistor 102-2, an electrical power in which the emitter current (collector current) and a collector-emitter voltage are multiplied to each other is consumed. Since this electrical power is a useless electrical power consumed as heat, the prior art driving control circuit had a problem that an electrical power efficiency in the driving circuit 102 showed a low value.

In view of the foregoing, it is an object of the present invention to provide a driving control circuit, a driving control method and an electronic equipment capable of improving an electrical power efficiency of the driving circuit.

SUMMARY OF THE INVENTION

In order to solve the aforesaid problems, the driving control circuit of the present invention is comprised of a driving means for changing a position of an item to be controlled; a comparing circuit for comparing a target value for use in setting a driving position of the driving means, a reference value generated in response to an AC signal and a controlling amount signal; a switching circuit to be turned on/off in reference to a comparing output of the comparing circuit so as to drive the driving means; and a position sensing section for use in sensing a position of the item to be controlled and outputting the controlling amount signal corresponding to a result of sensing.

In addition, in order to solve the aforesaid problems, the present invention provides a driving control method in which a target value for setting a position of an item to be controlled, a reference value generated in response to an AC signal and a controlling amount signal are compared to each other, a switching terns is turned on/off in response to a result of comparison, the item to be controlled is driven, a position of the item to be controlled is detected to generate the controlling amount signal.

Further, in the driving control method, the AC signal is of a triangular wave.

In addition, the driving control method is carried out such that the AC signal is of a wave form having a non-sensitive band.

Additionally, the driving control method is performed such that a phase of the controlling amount signal is compensated by a phase compensating circuit.

In addition, in order to solve the aforesaid problems, the present invention provides an electronic equipment which is comprised of an item to be controlled, a driving means for changing a position of the item to be controlled; a comparing circuit for comparing a target value for setting a driving position of the driving means a reference value generated in response to an AC signal and a controlling amount signal to each other, a switching circuit turned on/off in reference to a comparing output of the comparing circuit so as to drive the driving means; and a position sensing section for sensing a position of the item to be controlled and outputting the controlling amount signal in response to a result of sensing.

In the electronic equipment of the present invention, the AC signal is of a triangular wave.

Further, in the electronic equipment of the present invention, the AC signal is of a wave-form having a non-sensitive band.

In addition, in the electronic equipment of the present invention, a phase of the controlling amount signal is compensated by the phase compensating circuit.

In accordance with the present invention constructed as described above, it is possible to perform a driving operation by turning on/off the switching means, so that a loss of electrical power of the switching means can be reduced to a quite low value. That is, when the switching means is constituted by a transistor or the like, the loss of electrical power in the case that the transistor is turned off is zero and when the transistor is turned on to supply a current to a load such as an actuator or the like connected to the transistor, the transistor is saturated, resulting in that a voltage between its collector and emitter is merely a saturation voltage of about 0.2 V and so a quite low electrical power is lost at the transistor.

As described above, the driving control circuit of the present invention enables an electrical power efficiency to be improved remarkably as compared with that of the prior art driving control circuit.

DESCRIPTION OF THE PREFERRED EMBODIMENTS

Figure 1:
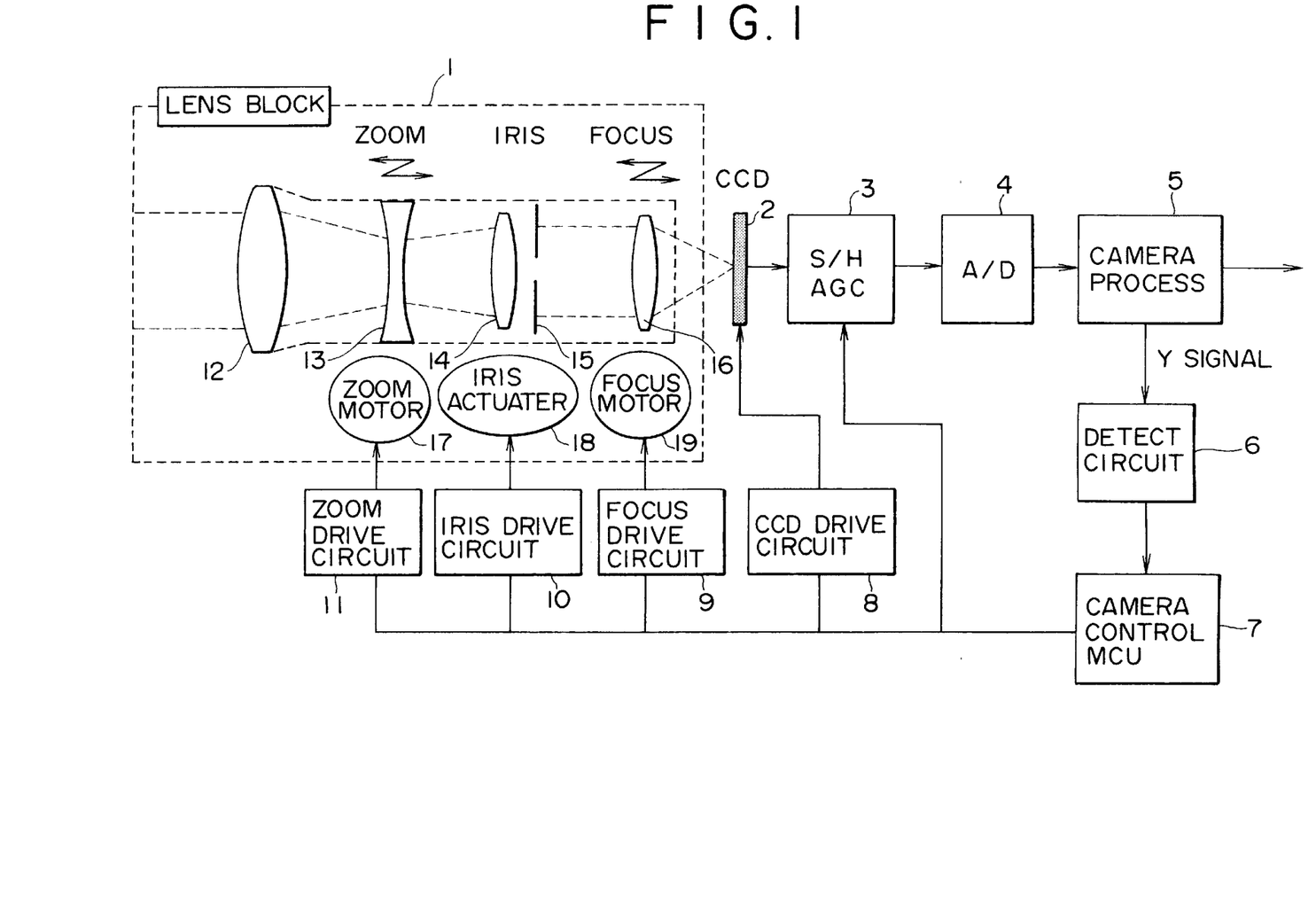
FIG. 1 is a block diagram for showing an example of a configuration of a camera control system of a photographing equipment provided with the driving control circuit of the present invention.

In FIG. 1 is shown a block diagram for showing a configuration of an electronic equipment to which the driving control circuit embodying the driving control method of the present invention. In FIG. 1, the electronic equipment is a photographing equipment such as a video camera or the like and only a configuration of the camera control system is illustrated.

In FIG. 1, reference numeral 1 denotes a lens block comprised of a group of lenses such as a plurality of lenses 12, 13, 14 and 16 and an iris 15; 2 a charge coupled device (CCD) for receiving light from an object taken by the lens block 1 and converting the light into an electrical signal; 3 S/H AG circuit comprised of a sampling hold circuit for sampling hold (S/H) a photographing signal from CCD 2 and an AGC (Auto Gain Control) circuit for performing a gain control of the photographing signal; 4 A/D converter for converting a photographing signal outputted from S/H AGC circuit 3 to a digital signal; and 5 a camera processing section for processing the photographing signal changed into a digital signal.

In addition, 6 denotes a detect circuit for detecting a brightness signal (Y signal) outputted from the camera processing section; 7 a camera control MCU for receiving a level information of the brightness signal detected by the detecting circuit 6 and controlling the lens block 1, CCD 2 and S/H AGC circuit 3.

In addition, a zoom lens 13 is arranged within the lens block 1, the zoom lens 13 is moved by a zoom motor 17 in a forward or rearward direction to enable a zooming of the object to be expanded or shrunked. This zoom motor 17 is controlled in its driving by the zoom drive circuit 11.

Further, the focus lens 16 within the lens block 1 can be moved in a forward or rearward direction by a focus motor 19, its position is controlled by the focus motor 19, thereby an incident light is focused on the CCD 2. This focus motor 19 is controlled in its driving by the focus drive circuit 9.

Further, in addition, the iris 15 is controlled by the iris actuator 18 and then an amount of light incident onto the CCD 2 is controlled. This iris actuator 18 is controlled in its driving by the iris drive circuit 10.

Additionally, CCD2 is driven by the CCD drive circuit 8.

The aforesaid zoom motor 17, iris motor 18 or focus motor 19 are of an electromagnetic motor, wherein each of these electromagnetic motors is controlled toward a target value set on the basis of the control of the camera control section 7. Driving of these electromagnetic motors is carried out by the zoom drive circuit 11, the iris drive circuit 10 and the focus drive circuit 9 and in the present invention, the driving control circuits acting as each of the driving circuits is made as a circuit in which a loss of electrical power is not produced as less as possible.

Figure 2:
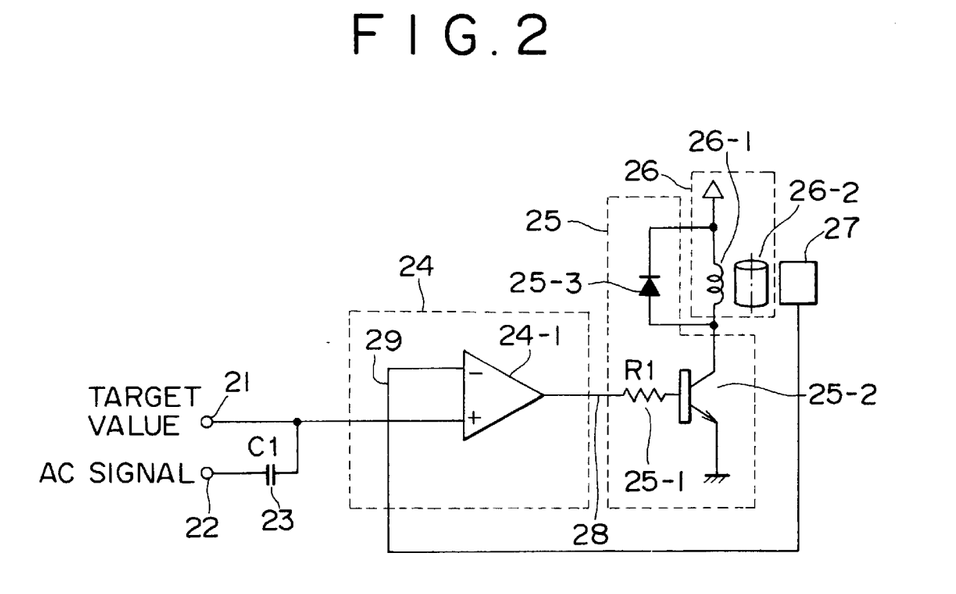
FIG. 2 is a view for showing a circuit of a first preferred embodiment of the driving control circuit of the present invention.

In view of this fact, the iris driving circuit 10 will be described as follows. In FIG. 2 is shown a circuit diagram of the first preferred embodiment of the driving circuit of the present invention embodying the driving control method of the present invention.

In FIG. 2, reference numeral 24 denotes a control arithmetic circuit; 25 a driving circuit; 26 an actuator; and 27 a position sensing unit comprised of hole elements for sensing the position of the rotor magnet 26-2 of the actuator 26.

In addition, a target value for rotationally controlling the actuator section 26 to its desired position is inputted to the control arithmetic circuit 24 and further a control amount signal 29 outputted from the position sensing unit 27 is inputted to the control arithmetic circuit 24. Within the control arithmetic circuit 24, the target value is inputted to the non-inverting input terminal of the OP amplifier 24-1 and the control amount signal 29 is inputted to the inverting input terminal of the OP amplifier 24-1. In addition, an AC signal such as a triangular wave or the like inputted through a terminal 22 is inputted to a non-inverting input terminal of the OP amplifier 24-1 through a direct current prohibiting capacitor C1. Further, a negative feed-back impedance element is not connected between the inverting input terminal and the output terminal of the OP amplifier 24-1.

Further, the driving circuit 25 is comprised of a transistor 25-2 turned on/off in reference to a deviation 28 outputted from the OP amplifier 24-1 of the control arithmetic circuit, and a diode 25-3 for restricting an induced high voltage generated between both ends of the actuator coil 26-1 controlled in its driving with the transistor 25-2. Further, a resistor (R1) 25-1 is used for supplying an appropriate base current to the transistor 25-2.

In addition, the actuator section 26 is constituted by an actuator coil 26-1 driven and controlled by the driving circuit 25, and a rotor magnet 26-2 rotated in response to an amount of current flowing in the actuator coil 26-1.

Figure 4:
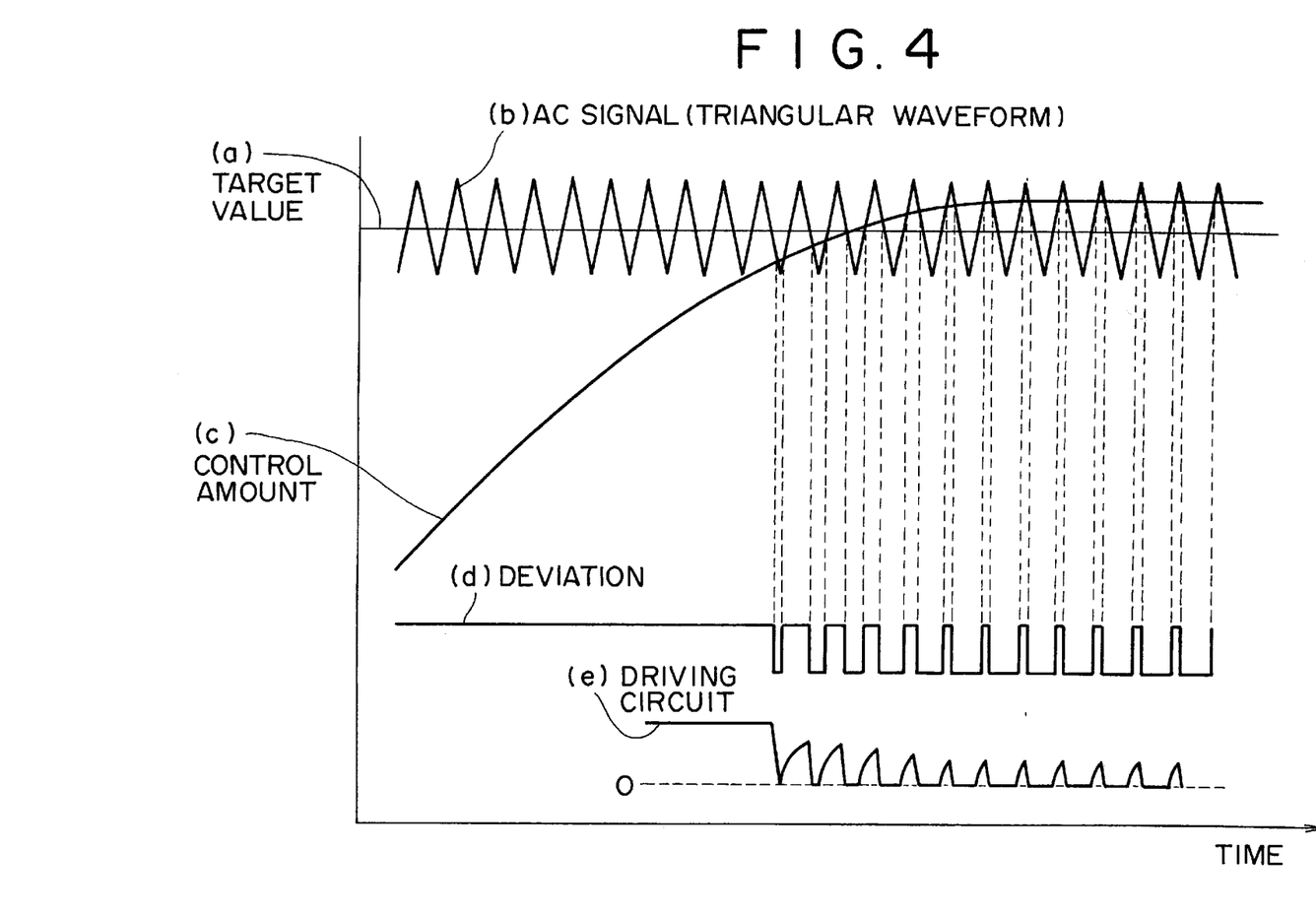
FIG. 4 is a view for showing an operation wave-form in a circuit of the first preferred embodiment of the driving control circuit of the present invention.

Referring now to the operation wave-form diagram of FIG. 4, an operation of the driving control circuit of the present invention constructed as described above will be described as follows. In FIG. 4, a wave-form of each of a target value signal (a), an AC signal (b) in a triangular wave-form, a control amount signal (c), a deviation (d) and a driving current (e) on an axis of time, respectively.

Since no negative feed-back impedance element is connected to the OP amplifier 24-1, the OP amplifier 24-1 may operate as a comparator. Accordingly, a signal inputted to the non-inverting input terminal of the OP amplifier 24-1 is compared with a signal inputted to an inverting input terminal and a comparing output of either a high level or a low level is outputted as a deviation 28. In this case, since both a target value signal and an AC signal are being inputted at the non-inverting input terminal, a triangular wave with a level shown at (b) in FIG. 4 biased at a level of the target value signal is inputted to the non-inverting input terminal.

In turn, a control amount signal 29 shown at (b) in FIG. 4 outputted from the position sensing unit 27 is inputted to the inverting input terminal of the OP amplifier 24-1.

Accordingly, a deviation 28 outputted from the OP amplifier 24-1 where levels of both input signals are compared to each other becomes a pulse-like wave-form of either a high-level or low-level indicated at (b) in FIG. 4.

As apparent from FIG. 4, a pulse width of the deviation 28 is a pulse width corresponding to the level of the controlling amount (c).

In this case, as the transistor 25-2 is driven to be turned on in reference to the deviation 28 and a driving current is supplied to the actuator coil 26-1, the rotor magnet 26-2 starts to rotate toward the target value and a controlling amount (c) outputted from the position sensing unit 27 for use in sensing its rotating position is gradually increased. At this time, although the deviation 28 keeps its high level and the transistor 25-2 is driven to its ON state, as the value of the deviation 28 approaches the target value (a) to become a level exceeding an AC signal biased by the target value signal (a), the deviation 28 of an output of the OP amplifier 24-1 is inverted into a low level.

However, since the AC signal (b) repeats vibration as shown in the figure, it is changed to increase in a subsequent time to exceed the controlling amount (c), the deviation 28 of the output of the OP amplifier 24-1 is inverted again to its high level. Such an operation as above is repeated as shown in the figure to cause the rotor magnet 26-2 to be rotated up to a position of the target value and a pulse width of the deviation 28 has a specified duty ratio.

In this case, since the transistor 25-2 is turned on/off with the deviation 28 of pulse wave-form, a loss of electrical power with the transistor 25-2 is minute. That is, when the transistor 25-2 is turned off, an impedance of the transistor 25-2 becomes a quite high impedance, electrical power is scarcely consumed and in turn when the transistor 25-2 is turned on, the transistor 25-2 is saturated, the voltage between the collector and the emitter is a minute voltage of about 0.2 V, resulting in that an electrical power loss consumed by the transistor 25-2 becomes minute.

In addition, a driving current supplied to the actuator coil 26-1 in this case becomes one shown in FIG. 4(e). That is, as the deviation 28 becomes a pulse-like form, it becomes a saw-tooth current wave-form having this pulse integrated and the rotor magnet 26-2 is rotationally driven by a magnetomotive force generated at the actuator coil 26-1 by this driving current.

When the transistor 25-2 is turned off, a high induction voltage is generated at the actuator coil 26-1, and a current is flowed in the diode 25-3 by this induced voltage so as to cause the induced voltage to be restricted. Accordingly, it is possible to prevent a noise or the like from being generated.

In the driving control circuit of the present invention shown in FIG. 2, the electrical power loss in the driving circuit 25 can be reduced to a substantial zero value as described above, so that an electrical power efficiency of the driving circuit 25 can be substantially improved.

Figure 3:
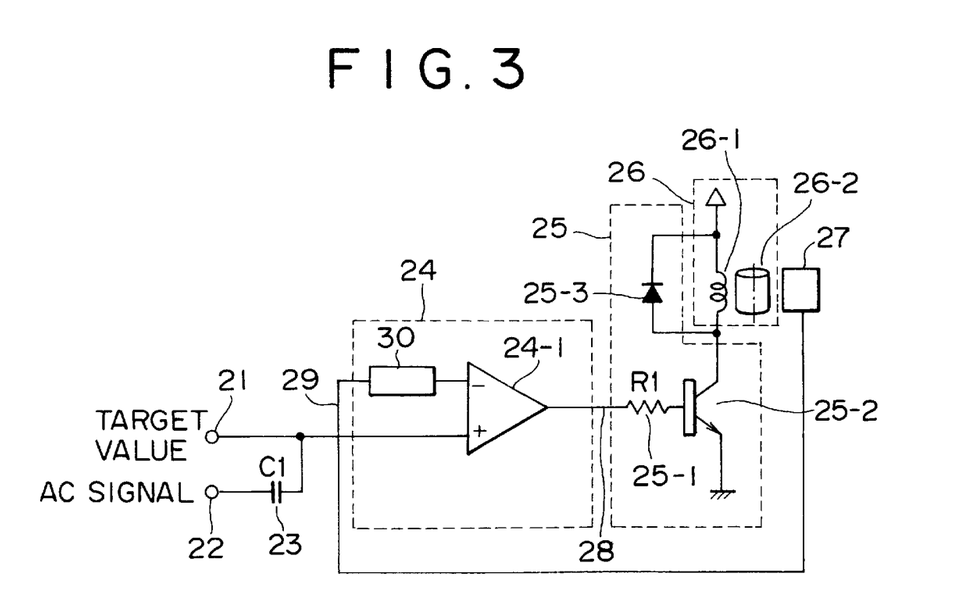
FIG. 3 is a view for showing a circuit of a second preferred embodiment of the driving control circuit of the present invention.

In addition, in FIG. 3 is shown a circuit diagram of the second preferred embodiment of the driving control circuit of the present invention. In this driving control circuit, there is provided a phase compensating circuit 29 as compared with the driving control circuit shown in FIG. 2, wherein a control amount signal outputted from the position sensing unit 27 is compensated for its phase. Due to this fact, in the second preferred embodiment, a controlling characteristic is further improved. In addition, since other configurations are similar to that of the first preferred embodiment, detailed description about the second preferred embodiment will be eliminated.

Figure 5A:
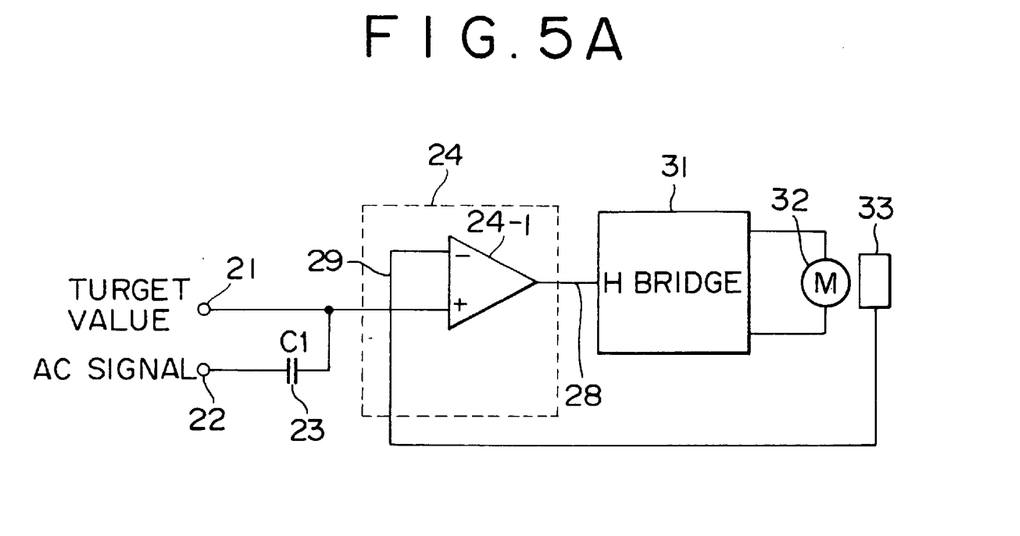
FIGS. 5A and 5B are views for showing a circuit of a third preferred embodiment of the driving control circuit of the present invention.

In addition, in FIG. 5A is shown a circuit diagram of the third preferred embodiment of the driving control circuit of the present invention. In this third preferred embodiment, there is illustrated a driving control circuit for controlling a rotating amount of the motor.

In FIG. 5A, reference 24 denotes a control arithmetic circuit; 31 a bridge circuit (H bridge) for driving a motor 32; 32 a motor driven to rotate in a normal or reverse direction by the bridge circuit 31; and 33 a position sensing unit constituted by a hole element for sensing a rotating position of the motor 32 or the like.

In addition, a target value for rotationally controlling the motor 32 up to a desired position is inputted from the terminal 21 to the control arithmetic circuit 24 and also a control amount signal 29 outputted from the position sensing unit 33 is inputted to the control arithmetic circuit 24. Within the control arithmetic circuit 24, the target value is inputted to a non-inverting input terminal of the OP amplifier 24-1 and the control amount signal 29 is inputted to the inverting input terminal of the OP amplifier 24-1. An AC signal such as a triangular wave inputted from the terminal 22 is inputted to the non-inverting input terminal of the OP amplifier 24-1 through a capacitor (C1) for prohibiting DC current. The negative feed-back impedance element is not connected between the inverting input terminal and the output terminal of the OP amplifier 24-1.

Figure 5B:
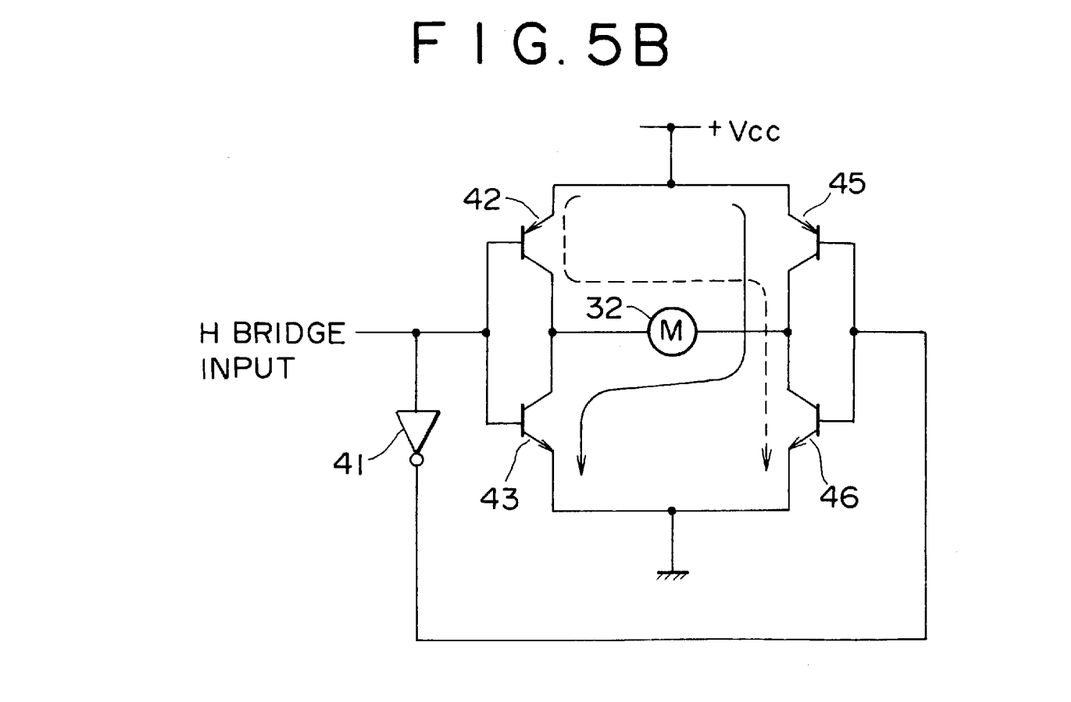

In addition, the bridge circuit 31 is constituted as shown in FIG. 5B. The bridge circuit 31 is comprised of PNP transistor 42 and NPN transistor 43 connected in series and having their bases connected to each other and at the same time PNP transistor 45 and NPN transistor 46 connected in sequence and having their bases connected to each other, and further the emitters of the PNP transistors 42, 45 and the emitters of NPN transistors 43, 46 are connected to each other. Then, the motor 32 is connected between the connecting points in series.

The deviation 28 outputted from the OP amplifier 24-1 of the control arithmetic circuit 24 is inputted to the bridge circuit 31 constructed as described above, although the deviation 28 is input ted to the base of one series connected circuit as it is and at the same time it is inverted by the inverting circuit 41 and inputted to the base of the other series connected circuit.

The operation of the driving control circuit of the third preferred embodiment of the present invention constructed as above will be described, wherein the negative feed-back impedance element is not connected to the OP amplifier 24-1, resulting in that the OP amplifier 24-1 is operated as a comparator. Accordingly, a signal inputted to the non-inverting input terminal of the OP amplifier 24-1 is compared with a signal inputted to the inverting input terminal and the output of comparison is outputted as the deviation 28. In this case, since the target value signal and the AC signal are inputted to the non-inverting input terminal, a triangular wave-form (in the case that an AC signal is of a triangular wave) of a level indicated at (b) in FIG. 4 biased at a level of the target value signal is inputted to the non-inverting input terminal.

In turn, the control amount signal 29 indicated at (c) in FIG. 4 outputted from the position sensing unit 33 is inputted to the inverting input terminal of the OP amplifier 24-1 as it is.

Accordingly, the deviation 28 of either the high level or the low level outputted from the OP amplifier 24-1 in which levels of both input signals are compared to each other becomes a pulse-like wave-form as indicated at (d) in FIG. 4. A pulse width of the deviation 28 becomes a pulse width corresponding to the level of the control amount signal 29.

In this case, a reason why the deviation 28 becomes a pulse-like wave-form indicated at (d) in FIG. 4 is similar to that of the aforesaid driving control circuit, when this pulse-like deviation 28 is kept at a high-level, the transistors 43, 45 in the bridge circuit 31 are turned on, resulting in that the current supplied from +B power supply flows to the ground through the transistor 45, motor 32 and transistor 43 as indicated by solid line. With such an arrangement as above, the motor 32 is rotated in a normal (inverse) direction.

In addition, when the pulse-like deviation 28 is kept at a low level, the transistors 42, 46 in the bridge circuit 31 are turned on, and the current supplied from +B power supply flows to the ground through the transistor 42, motor 32 and transistor 46 as indicated by broken lines. With such an arrangement as above, the motor 32 is rotated in an inverse (normal) direction. Such an operation as above is repeated to cause the motor 32 to be rotated up to a target position. In this case, the transistors 42 to 46 are turned on/off with the deviation 28 of pulse-like wave-form, resulting in that the loss of electrical power caused by the transistors 42 to 46 becomes a minute value. That is, when the transistors 42 to 46 are turned off, the impedances of the transistors 42 to 46 become quite high impedances, electrical power is scarcely consumed and in turn when the transistors 42 to 46 are turned on, the transistors 42 to 46 are saturated, a voltage between the collector and the emitter becomes a minute voltage of about 0.2 V, resulting in that a loss of electrical power consumed by the transistors 42 to 46 becomes a minute value.

Accordingly, when the driving control circuit shown in FIGS. 5(a), (b) is applied to the zoom driving circuit 11 or the focus driving circuit 9 shown in FIG. 1, it becomes possible to improve an electrical power efficiency of the driving circuit.

Figure 6:
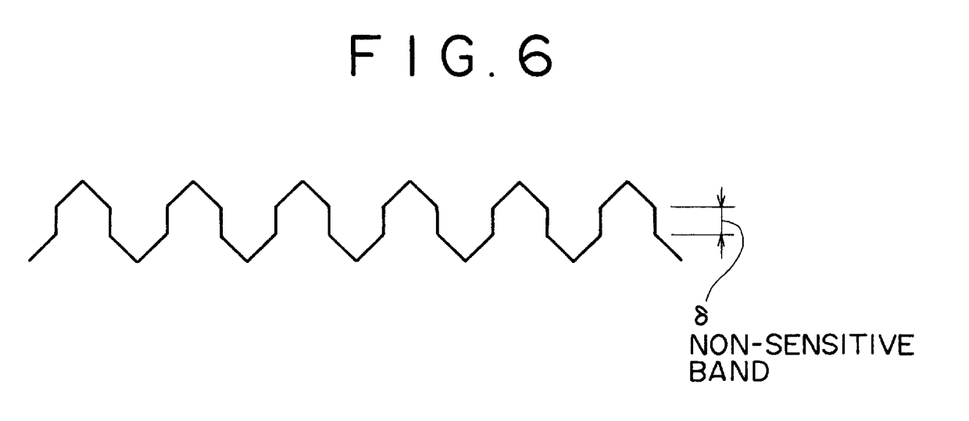
FIG. 6 is a view for showing another example of wave-form of an AC signal in the driving control circuit of the present invention.

Although the AC signal is a triangular wave-form in the example described above, this triangular wave can be generated by passing the rectangular wave with a synchronous signal through an integrating circuit. In addition, the AC signal can not be limited to the triangular wave, but it can be formed as an AC signal having another shape such as a saw-tooth. In addition, when the AC signal is made as a shape as shown in FIG. 6, it can be controlled in a non-linear manner. That is, when it is crossed with the control amount signal at the wave-form art rising upwardly, even if the level of the control amount signal is moved up or down within the vertical portion, the rising (lowering) timing of the deviation is not changed. Namely, it is possible to generate a non-sensitive band 6 with this vertical part. Production of such a non-sensitive band as above enables a duty of deviation to become about 50% when the control amount and the target value approach to each other.

In the aforesaid examples, the AC signal is added to the target value and inputted to the control arithmetic circuit, although the present invention is not limited to this arrangement, but the AC signal may be added to the control amount signal. In addition, as an example of application of the present invention, an optical amount control of the photographing device has been described, although the present invention is not limited to this arrangement and can be applied to all the general electronic equipment having the driving control circuit using the electromagnetic motor.

Since the present invention has been constructed as described above, the device can be driven by turning on/off the switching means and a loss of electrical power of the switching means can be reduced to a quite low value. Namely, when the switching means is constituted by transistors or the like, the loss of electrical power when the transistor is turned on is substantially zero, and when the transistor is turned on and an electrical current is supplied to a load such as the actuator connected to the transistor, the transistor is saturated, so that a voltage between the collector and the emitter is merely a saturated voltage of about 0.2 V and so a little loss of electrical power is found in the transistor.

As described above, the driving control circuit of the present invention can improve an electrical power efficiency in a remarkable manner as compared with that of the prior art driving control circuit.

Since the electrical power efficiency of the driving circuit can be improved, so it becomes possible to improve a time of use in a portable equipment.

In addition, it becomes possible to realize a non-linear control in a relative simple manner in reference to a wave-form of the AC signal.

What is claimed is:

1. A driving control circuit comprised of:
   driving means for changing a position of an item to be controlled;
   a comparing circuit for comparing a target value signal, inputted with an AC signal, for use in setting a driving position of said driving means with a controlling amount signal and generating an output;
   a switching circuit for operating the driving means, which is turned on or off as a result of the output of said comparing circuit; and
   a position sensing unit for sensing a position of said item to be controlled and outputting said controlling amount signal.

2. A driving control circuit according to claim 1, wherein said AC signal is of a triangular wave-form.

3. A driving control circuit according to claim 1, wherein said AC signal is of a wave-form having a non-sensitive band.

4. A driving control circuit according to claim 1, wherein said control amount signal is compensated for its phase by a phase compensating circuit.

5. A method for improving the electrical sower efficiency of a driving circuit, said method comprising the steps of generating an output from a comparing circuit which compares a target value signal, inputted with an AC signal, for use in setting a driving position of said driving means with a controlling amount signal turning switching means on or off as a result of said output and driving the item to be controlled detecting a position of the item to be controlled to generate said controlling amount signal.

6. A driving control method according to claim 5, wherein said AC signal is of a triangular wave.

7. A driving control method according to claim 5, wherein said AC signal is of a wave form having a non-sensitive band.

8. A driving control method according to claim 5, wherein a phase of said controlling amount signal is compensated by a phase compensating circuit.

9. An apparatus for improving the electrical power efficiency of a driving circuit comprised of:

an item to be controlled;

driving means for changing a position of the item to be controlled;

a comparing circuit for comparing a target value signal, inputted with an AC signal, for use in setting a driving position of the driving means with a controlling amount signal and generating an output;

a switching circuit for operating the driving means, which is turned on or off as a result of the output of said comparing circuit; and a position sensing unit for sensing a position of the item to be controlled and outputting said controlling amount signal.

10. An electronic equipment according to claim 9, wherein said AC signal is of a triangular wave.

11. An electronic equipment according to claim 9, wherein said AC signal is of a wave-form having a non-sensitive band.

12. An electronic equipment according to claim 9, wherein a phase of said controlling amount signal is compensated by the phase compensating circuit.

* * * * *

UNITED STATES PATENT AND TRADEMARK OFFICE
CERTIFICATE OF CORRECTION

PATENT NO. : 6,031,351
DATED : January 11, 2000
INVENTOR(S) : John Mahn, Jr.

It is certified that error appears in the above-identified patent and that said Letters Patent is hereby corrected as shown below:

Patent Application,
Line 19, claim 29, reads "support sheet layer" should be -- support sheet --.

Signed and Sealed this

Twenty-eighth Day of August, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.   : 6,031,351
DATED        : February 29, 2000
INVENTOR(S)  : Naoki Kawaguchi It is certified that error appears in the above-identified patent and that said Letters Patent is hereby corrected as shown below:

This certificate supercedes certificate of correction issued August 28, 2001, the number was erroneously mentioned and should be deleted since no certificate of correction was granted.

Signed and Sealed this

Sixteenth Day of October, 2001

Attest:

*Nicholas P. Godici*

NICHOLAS P. GODICI
*Attesting Officer*    *Acting Director of the United States Patent and Trademark Office*